United States Patent
Tinsley et al.

(10) Patent No.: US 6,343,617 B1
(45) Date of Patent: Feb. 5, 2002

(54) SYSTEM AND METHOD OF OPERATION OF A DIGITAL MASS FLOW CONTROLLER

(75) Inventors: Kenneth E. Tinsley; Faisal Tariq, both of Plano, TX (US)

(73) Assignee: Millipore Corporation, Bedford, MA (US)

( * ) Notice: Subject to any disclaimer, the term of this patent is extended or adjusted under 35 U.S.C. 154(b) by 0 days.

(21) Appl. No.: 09/350,744

(22) Filed: Jul. 9, 1999

(51) Int. Cl.[7] ................................................ G05D 7/06
(52) U.S. Cl. ..................................... 137/486; 137/487.5
(58) Field of Search ............................... 137/486, 487.5

(56) References Cited

U.S. PATENT DOCUMENTS

| | | | |
|---|---|---|---|
| 5,062,446 A | * 11/1991 | Anderson | 137/487.5 X |
| 5,660,207 A | 8/1997 | Mudd | 137/599 |
| 5,765,283 A | 6/1998 | Mudd | 29/890 |
| 5,850,850 A | 12/1998 | Mudd | 137/486 |
| 5,911,238 A | * 6/1999 | Bump et al. | 137/486 X |
| 5,944,048 A | * 8/1999 | Bump et al. | 137/486 X |

FOREIGN PATENT DOCUMENTS

| | | |
|---|---|---|
| EP | 0 110 325 A1 | 6/1984 |
| EP | 0 834 723 A1 | 10/1996 |

* cited by examiner

*Primary Examiner*—Gerald A. Michalsky
(74) *Attorney, Agent, or Firm*—Gray, Cary Ware & Freidenrich, LLP

(57) ABSTRACT

The mass flow controller of the present invention includes a sensor. This sensor is used to detect a mass flow within a gas line. Additionally, this sensor provides an output to an electronic control system coupled to the sensor. The electronic control system will determine an expected mass flow based on the output of the sensor. The electronic control system will adjust a control valve with a control signal to regulate a first gas flow through the control valve.

10 Claims, 5 Drawing Sheets

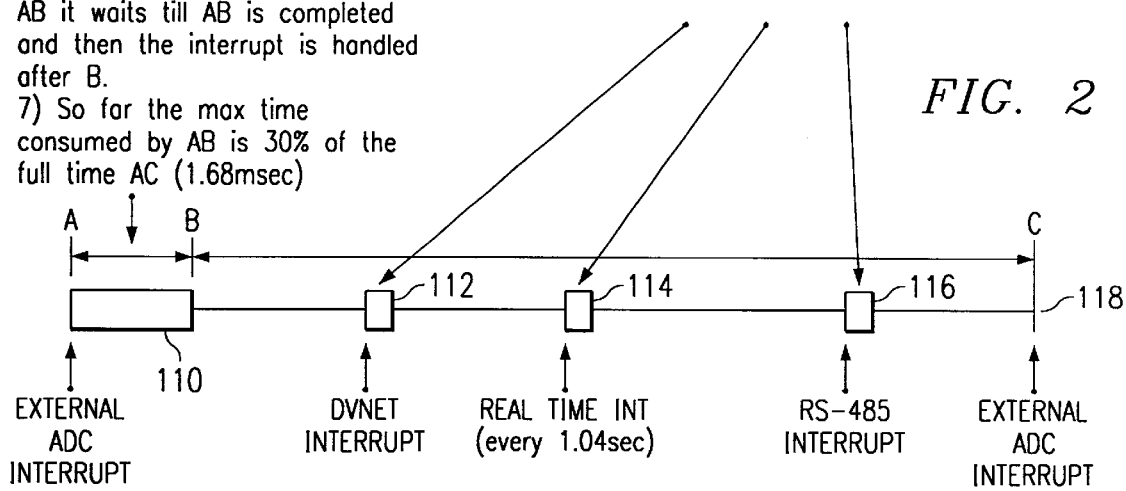

1) All "Data Processing" (for Controls, linearization, Totalizer, EEPROM, Diagnostics, e.t.c) is done here (within AB).
2) AB+BC=1.68msec.
3) As processing time grows AB will grow decreasing BC.
4) AC=1.68msec is generated by the external ADC.
5) No interrupts are allowed during AB.
6) If an interrupt occurs during AB it waits till AB is completed and then the interrupt is handled after B.
7) So far the max time consumed by AB is 30% of the full time AC (1.68msec)

1) No other interrupts are allowed till the end of the interrupt subroutine.
2) Any of these three interrupts can happen in any order and at any location.
3) Only data transfer is done here, the actual processing of data is done afterwards at AB
4) These ISRs typically consume 0.06% to 0.1% of the total 1.68msec

*FIG. 2*

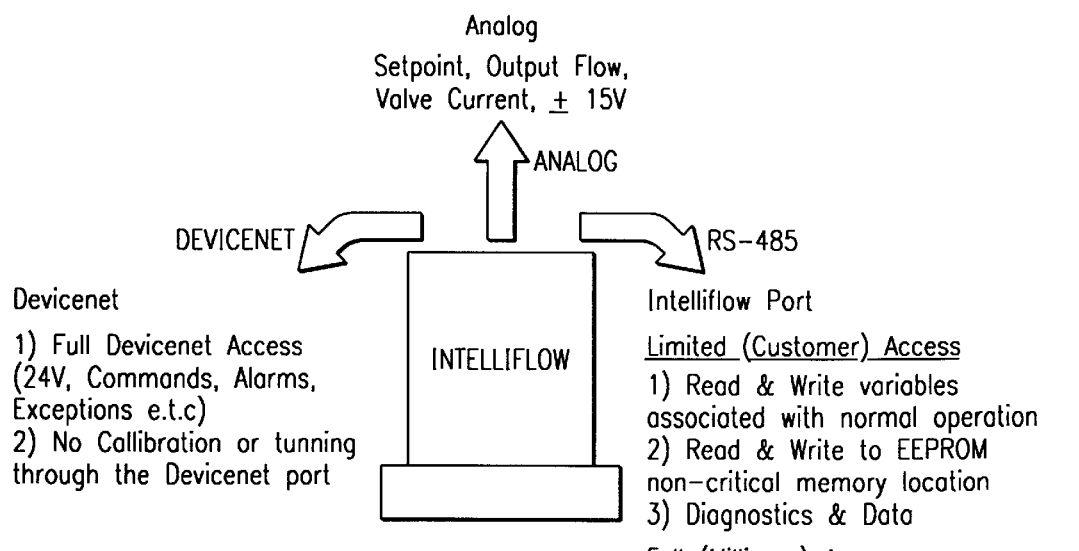

Devicenet
1) Full Devicenet Access (24V, Commands, Alarms, Exceptions e.t.c)
2) No Callibration or tunning through the Devicenet port Intelliflow Port Limited (Customer) Access
1) Read & Write variables associated with normal operation
2) Read & Write to EEPROM non-critical memory location
3) Diagnostics & Data Full (Millipore) Access
1) Read & Write to any EEPROM location by address and by name
2) Read & Write to any memory variables by address and by name (Allow Tunning and Calibration)
3) Diagnostics, Data and Calibration

*FIG. 5*

SYSTEM AND METHOD OF OPERATION OF A DIGITAL MASS FLOW CONTROLLER

RELATED APPLICATIONS

This application is related to U.S. patent application Ser. No. 09/350,747 entitled "System and Method for Sensor Response Linearization," filed Jul. 9, 1999 by Thomas Pattantyus, et. al.

This application is related to U.S. patent application Ser. No. 09/350,746 filed on Jul. 9, 1999, by D. S. Larson et al., entitled "Improved Mass Flow Sensor Interface Circuit".

This application is related to U.S. patent application Ser. No. 09/351,120 filed on Jul. 10, 1999, by E. Vyers, entitled "System and Method for a Digital Mass Flow Controller."

This application is related to U.S. patent application Ser. No. 09/351,098 filed on Jul. 10, 1999, by E. Vyers, entitled "System and Method for a Variable Gain Proportional-Integral (PI) Controller."

This application is related to U.S. patent application Ser. No. 09/351,111 filed on Jul. 10, 1999, by T. T. Pattantyus, entitled "Method and System for Driving a Solenoid."

TECHNICAL FIELD OF THE INVENTION

This invention relates generally to systems and methods for operating a mass flow controller (MFC) with a closed loop control system utilizing an advanced digital control algorithm. More specifically, the present invention provides a closed loop control system for operating a mass flow controller, wherein all mathematical operators are realized within a digital processor.

BACKGROUND OF THE INVENTION

Many manufacturing processes require that the introduction rates of process gases into a process chamber be strictly controlled. These types of processes use mass flow controllers (MFCs) to control the flow rate of gases. Many problems exist with current technology mass flow controllers.

MFC's have a high cost of ownership due to unscheduled maintenance of the tools in which the MFC are installed. Often there is no indication as to a specific type of failure. Common practice is to replace the MFC since it is perceived as a dynamic device that is believed to be inherently unreliable. As a result, a significant number of MFC's are returned to the factory and found to operate as specified resulting in a no problem found failure analysis.

The lack of internal diagnostics or the ability to provide remote service of the MFC and remote diagnostics necessitates that a well trained field service engineer or application engineer must visit the customer site to provide on-site tech support and failure analysis once an MFC has been installed. Another shortcoming is that the individual device performance, specifically accuracy and response time or transient performance, is dependent upon a time-consuming, labor-intensive, manual calibration and tuning process, using potentiometers or variable resistors.

Today, the manufacturing process is a highly manual process requiring that a technician use several devices such as oscilloscopes, different secondary flow measurement devices, and the like and visual inspections of those other devices to determine certain signals and tunes the potentiameters to his satisfaction.

This creates a set of devices that are dependent upon the personnel that tune the devices. The devices are commonly non-uniform and not repeatable from one unit to the other creating complex process engineering and characterization problems so each device has its own unique behavior associated with the device. MFC behavior is directly a function of the manual tuning process and the technician that performs the process. Additionally, the transit response of traditional mass flow controllers are not uniform. The performance from, for example, 0 or 10% of set point is different from 0–100%. This varying response creates a problem for the process control engineers that depend on these devices. The unique response of an individual device forces engineers to uniquely characterize MFC device behavior to account for the variability and the response times depending upon certain situations. This characterization process is both expensive and time consuming.

Current MFC's are sensitive to inlet pressure. The mass flow controller requires a certain inlet pressure specification and the differential pressure is normally specified to be approximately 45 PSID so the performance of existing MFC devices are typically optimized as to one specific pressure. Trade-offs are made when the inlet pressure is varied over a particular pressure range, which creates more variability of the response time and characterization of a device.

One solution to inlet pressure sensitivity requires that the user install often expensive pressure regulators.

In the gas lines that supply the gas to the MFC it would be advantageous to have a mass flow controller that is not sensitive to pressure fluctuations in order that expensive pressure regulation hardware can be removed. Furthermore, each device has a pressure transducer adjacent to the pressure regulator which sole purpose is to indicate that the pressure regulator is functioning.

Furthermore, there is a need to comply with emerging standards open communication standards and instrumentation. EIARS485 is an open standard for multi-drop but it only describes the physical layer. So the software protocol stack is subject proprietary implementations from one supplier to another. So it is desirable to have mass flow controllers that have high performance communications service ability that implement open protocols while not sacrificing flow control parameters.

A powerful solution to understanding unknown or poorly understood processes is to learn of the process through regression analysis. Regression analysis is a structured approach utilizing carefully designed experiments to optimize multivariable engineering processes. This technique allows a process to be understood and potentially exploited through a series of experiments. The usual method of estimation for the regression model is ordinary least squares (OLS).

Regression analysis also allows the creation of diagnostic procedures that compare the predicted values to actual values to evaluate the performance of the regression estimates through the use of residuals.

The overall task is to provide the best flow control performance possible while not sacrificing other issues such as communications, multiple gas calibrations and cost of ownership.

SUMMARY OF THE INVENTION

The present invention provides a system and method for operating a mass flow controller that substantially eliminates or reduces disadvantages and problems associated with previously developed systems and methods for operating a mass flow controller.

The chosen architecture of the present invention does not sacrifice to flow control for the ability to service a communications network.

The present invention provides embedded diagnostics within the chosen architecture or system. Specifically, the digital engine of the present invention will discretely monitor system variables. These variables include but are not limited to the flow set-point, solenoid current, ambient temperature, the resistance of the flow sensor, and the inlet pressure which may be measured by an external pressure transducer. Several of these variables are a valuable source of information to monitor and to reduce MFC pressure sensitivity. The digital engine also will monitor power supply voltages.

The internal digital mass flow controller embedded system architecture specifically improves to improve the performance of an MFC over prior art systems and adds several value-added features.

The mass flow controller of the present invention does not contain any variable manual adjustments. This provides an advantage in that all calibration and tuning is completed digitally via storage of a unique set of constants stored in non-volatile memory. Access to the relevant memory locations is provided via the dedicated RS485 interface. The calibration system host, running the appropriate software and interfacing to specific flow measuring instrumentation, can automatically calibrate and tune the mass flow controller of the present invention for uniform repeatable performance in static and transient flow conditions. These uniform transient responses provide an addition advantage of the present invention. These uniform transient responses are achieved by using the computational power provided by the selected digital signal processor as applied in the chosen architecture. This architecture allows 100% of the control algorithms to be implemented via software. The software algorithms can contain mechanisms to invoke unique case-sensitive or situational parameters that can be selected or tuned to achieve a uniform and repeatable transient response.

Yet another advantage of the present invention is to eliminate the need for expensive upstream pressure regulators within a gas supply. The digital engine of the present invention has the capability to discretely monitor the inlet pressure via an available A/D input. It is desirable to monitor the input pressure and desensitize the mass flow characteristics of the output of the present invention.

A further advantage of the present invention is that it can contain multiple autonomous dedicated digital communication ports. This architecture allows multiple digital networks to be serviced simultaneously. Specific embodiments of the present invention provide that one network is an RS485 type network. The chosen DSP includes an embedded UART peripheral that is dedicated to service RS485 networks. An additional communication network can be serviced via reading and writing to a dual-port SRAM. The selection of the dual-port SRAM as a communication partition enables the support of autonomous interchangeable interfaces. The present invention should not be necessarily limited to these two communication ports. Multiple communication ports of various communication protocols as known to those skilled in the art can be incorporated into the present invention to achieve autonomous interchangeable interfaces.

An additional advantage of the present invention is that the embedded system manages events based upon receiving sample data from the flow signal at precise discrete intervals of 1.68 milliseconds. Due to the computational power of the chosen architecture, the control's algorithm completes its task in less than 30% of this time.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 2 illustrates a timing diagram of event management within the present invention;

FIG. 5 provides an overview of the communications associated with one embodiment of the present invention;

DETAILED DESCRIPTION OF THE INVENTION

Figure 1:
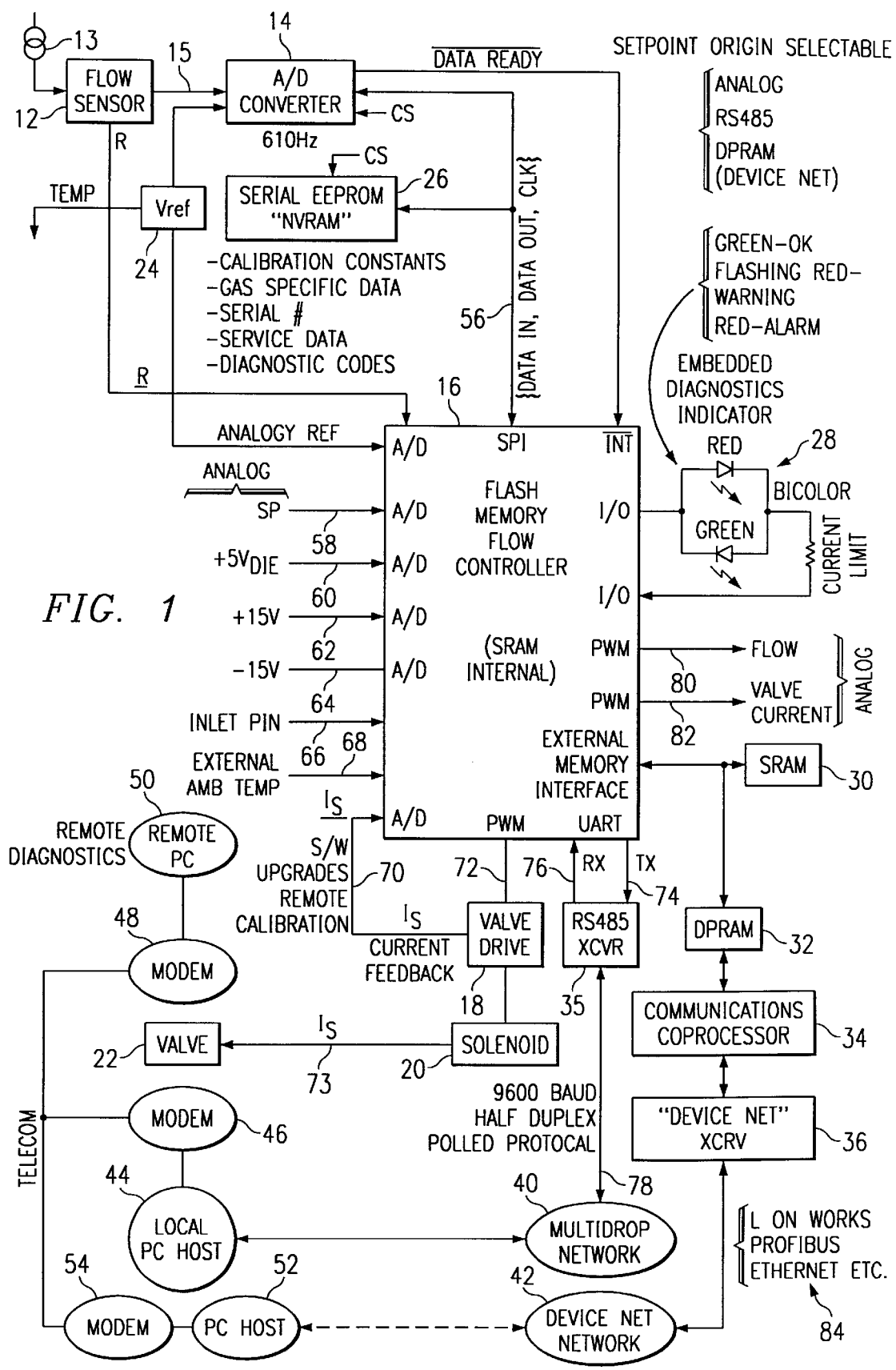
FIG. 1 provides a block diagram for one embodiment of the present invention.

Preferred embodiments of the present invention are illustrated in the FIGUREs, like numerals being used to refer to like and corresponding parts of various drawings.

The present invention provides an architecture system for a digital mass flow controller control system that includes embedded diagnostics within the control system. Specifically, the digital engine of the present invention will discretely monitor specific system variables for the purpose of improving troubleshooting and preventive maintenance programs. These variables include but are not limited to the flow set-point, solenoid current, ambient temperature, the base resistance of the flow sensor, the inlet pressure which may be measured by an external pressure transducer. These variables are a valuable source of information to monitor and to reduce MFC pressure sensitivity. The digital engine also will monitor power supply voltages.

The monitored variables are used to determine a more accurate flow measure within the MFC of the present invention.

The present invention uses a digital engine, meaning digital signal processor interfaced to an A-to-D converter. And specifically, in one embodiment of the present invention an architecture or a digital signal processor that has 16 channels of 10-bit A-to-D conversion has been chosen. In this architecture, embedded A-to-D channels are used for acquiring the desired data. The present invention uses an external intelligent A-to-D converter to digitize the sensor output since it requires higher resolution than 10 bits. In addition to those monitored parameters, several flow control events are monitored including the steady to state error. Further, the accuracy of the flow controller with respect to the set point provided by the user's tool is continuously monitored. The present invention also measures the valve leakage.

The present invention contains a unique algorithm executed by a digital engine. The specific algorithms will determine whether or not the set-point for flow control is zero and if measured flow is greater than 2% of full scale which is an industry standard to provide a warning that the valve is leaking. A common failure mode for the MFC is a failed actuator or valve. This failure manifests itself either as a leak or inability to control. Therefore, one would measure steady state error, valve leak and measure whether or not significant overshoot exists of the response at rising or ascending set points. For example, if one observes the set-point 2.0 from zero to 100% full scale and if the set-point exceeds or the response overshoots a predetermined value, then a warning is provided to the user. Providing access to all of these monitored parameters will reduce down time and the unnecessary removal of MFC devices otherwise properly functioning. The architecture of the present invention minimizes the time required to service and repair MFC devices that are not functioning properly because of the level of diagnostics provided to localize the full analysis process to specific areas.

It is desirable that open communication networks, such as Devicenet™, and the like, will be available for the flow control process management system to control the device. Another communications port is dedicated to service. Therefore, an RS485 port or other like port is dedicated to providing service. Therefore, communication is established via the open communications port for process control. There is a dedicated RS485 network that has a proprietary communications protocol that is compliant with the OSI model for networking within the present invention.

An OSI model for networking is an open system. The OSI model is a method that is commonly used to network PC's. This model is a low-level, broad model for implementing open systems interconnects for PC's.

The dedicated factory service port enables the present invention to provide remote diagnostics. The port can be used to implement local monitoring when linked to a dedicated laptop notebook or PC. Network monitoring via the port can be implemented by interfacing a laptop notebook or PC to the RS485 interface and outfitting or integrating a modem into the PC. Therefore an engineer, with modem access, can dial into the local computer and interrogate the present invention transparent to the flow control events. Further, the embedded diagnostics may be utilized by this engineer to provide a higher level of detail concerning potential failure modes.

The FIGUREs support the problems addressed by the present invention, as well as illustrating why the present invention's architecture provides advantages and features that are a function of solving the problems associated with the prior art.

FIG. 1 provides a block diagram for one embodiment of the present invention's embedded system or architecture. Block 12 represents the flow sensor. An A-to-D converter 14 monitors flow sensor 12. A-to-D converter 14 is interfaced to a 16-bit microcontroller or digital signal processor (DSP) 16.

One embodiment of the present invention utilizes a Texas Instrument TMS320F240 DSP as DSP 16. This DSP contains embedded flash memory that allows the software code within the DSP to be upgraded from an external network connection.

DSP 16 stores internal algorithms or software that can be executed to implement a closed loop control system. DSP 16 provides an electronic signal 72 to valve drive module 18. Valve drive module 18 in turn provides current to solenoid 20. Solenoid 20 serves as the actuator mechanism to control valve 22.

Block 24 provides a voltage reference to the A-to-D converter 14. A-to-D converter 14 is embedded in flow controller or DSP 16.

There are two types of A-to-D converters:
(1) those embedded in flow controller or DSP 16, and
(2) an external instrumentation class A-to-D converter. Adjacent to the voltage reference is a serial electronically erasable programmable read-only memory (EEPROM) or non-volatile RAM (NVRAM) 26. EEPROM 26 is used to store unique calibration and gas-specific data with serial number, service data and various diagnostic codes. Diagnostics are one of the major features that the architecture of the present invention brings forth. To the right of the DSP 16 is a bi-color LED circuit 28 and a static ram or SRAM 30. In addition to SRAM 30 is external dual port ram 32 (DPRAM). DRAM 32 is connected to communications co-processor 34. Communications co-processor 34 is interfaced to a sensor bus network with transceiver 36. This sensor bus network may be a DeviceNet, LonWorks, Profibus, ethernet or other like network as known to those skilled in the art.

An additional networking interface is provided via RS485 transceiver 38 embedded within flow controller or DSP 16.

The above blocks represent the major functional blocks located within the embedded system of one embodiment of the present invention.

Various networks may interface with the present invention. The embodiment above illustrates two network connections. However, the present invention need not be limited to two connections and may contain additional network connections. Multi-drop network 40 may interface with RS485 port 38. Multi-drop networks 40 and DeviceNet network 42 are examples of potential network connections. Multi-drop network 40 requires local PC 44 to act as a host. Local PC host 44 may contain a modem connection 48 allowing the present invention to be accessed via another modem 48 located or interfaced to remote PC 50.

DeviceNet network 42 can either be a peer-to-peer or peer-to-host type network. If the network has a peer-to-host relationship with respect to the DeviceNet network 42, the PC host can also monitor the network. This PC host may be PC 44 but need not be monitored by PC 44. Hence, this potentially separate PC is denoted as PC 52. This particular PC host 52 can also interface to a modem 54. Modem 54 can link via a telecom connection that can link remote modem 48 and associated remote PC 50.

Several signals and associated path warps are contained within this embodiment of the present invention. First, flow sensor 12 is excited with a current source 13 generating approximately 11 milliamps. Using thermal or heat transfer laws, as known to those skilled in the art, the mass flow rate is sensed. Signal 15, generated by flow sensor 12, is monitored by an A-to-D converter 14. This A-to-D converter is intelligent. Not only does A-to-D converter 14 monitor the flow signal; A-to-D converter 14 is programmable with respect to the resolution and sampling frequency.

The sampling frequency chosen for one embodiment is 610 Hz. 610 Hz provides a sampling period of 1.6 milliseconds. It is important to note that A-to-D converter 14 has a data ready signal which interrupts the microcontroller to let it know that it has a full set of sample data. This is important because of a multi-tasking embedded system that serves several input/output functions. The data ready signal interrupts the entire software, minimizing the effect of time delays that create inaccurate flow samples. The data ready signal issued provides the main trigger for the main functional software block, or software engine. Next a data signal may be sent over A-to-D converter 14 serial interface 56 which may be referred to as an SPI™ interface.

Via serial interface 56, flow controller 16 monitors A-to-D converter 14 and acquires a sample representative of the measured flow signal 15. This is repeated each time that the data ready signal indicates that A-to-D converter 14 has a new sample. In one embodiment, A-to-D converter 14 does this precisely at 1.6 millisecond intervals. However, it should be noted this interval is programmed and therefore flexible. 1.6 milliseconds was chosen for this embodiment because flow sensor 12 has an effective bandwidth of approximately 100 to 120 Hz. Therefore, 610 Hz was chosen as an effective sampling frequency to appropriately reconstruct the flow signal due to the analog-to-digital conversion process. Additionally, 610 Hz was chosen to provide enough time to serve other functions in a way that does not interrupt the data signal or interfere with other serviced events. This allows a master signal to be used as a trigger, leaving time to service other events.

On the left-hand side of flow controller 16, several external signals or analog signals 58–68 are monitored or interfaced to from either an internal or external source to the present invention. An example would be an analog set-point 58. Set-point 58 is a request from the host by the user for the intended flow rate. Typically, this set-point 58 is provided by a user's wafer processing tool when the present invention is used in a semiconductor processing environment. Additionally, digital 5-volt signal 60, +15 volt power supply 62, −15 volt power supply 64, a user's inlet pressure 66 and internal ambient temperature 68 inside the case of the mass flow controller are monitored by DSP 16.

The signal for internal ambient temperature 68 may be provided as an auxiliary function by the voltage reference device 24. Therefore, voltage reference device 24 may provide a precision 2.5-volt reference to A-to-D converter 14 in addition to a temperature output. One embodiment of voltage reference device 24 has an embedded band gap reference and temperature-assisted component or resistor on board, and a transfer function that relates resistance to temperature in degrees Celsius. Therefore, a measurement at room temperature in conjunction with the transfer function provides a real-time reading of the internal case temperature.

On line 72, valve drive circuitry 18, conditions signal 72 to drive a solenoid, but it also feeds back the actual solenoid current 70 for sensing purposes. The sensed solenoid current 72, set-point signal 55 and the measured flow 15 can be used to create relationships that provide faster diagnosis of problems.

A Universal Asynchronous Receiver Transmitter (UART) is used to generate a half duplex using an interface to an external host such as a PC RS485 network. This UART circuit does several things. The circuit provides access to all of the calibration and tuning parameters during manufacturing. The UART also provides another means for a user to control the MFC of the present invention.

FIG. 2 illustrates a timing diagram of event management. UART of flow controller 16 is coupled to RS485 with a transmit line 74 and receive line 76. TX indicates a transmitted signal and RX indicates a received signal from the host system of the flow controller and DSP 16.

A 9600 baud half duplex polled protocol line couples the RS485 XCVR 38 to multidrop network 40. 9600 baud was chosen in a manner similar to the sampling frequency. This provides an interface to an external host. This speed allows a safety margin with respect to other events that are serviced while not interfering with such other events. Several events inside the flow controller are monitored to provide diagnostics. Local indication of the status of those events is provided via a bi-color LED circuit 28 that can either be red or green. If LED circuit 28 is flashing red, then a monitored condition or event is above a warning condition or a warning threshold. If LED circuit 28 is solid red, then the warning has become an alarm. In most cases, an alarm condition indicates that the flow controller has experienced an unrecoverable fault.

The flow controller, DSP 16, will continue to attempt to operate. The event that caused the unrecoverable condition to occur is saved in non-volatile memory. Therefore, the event can be accessed via RS485 transceiver 38.

A current limiting resistor provides a feedback path from bi-color LED circuit 28 to a second IO port on the flow controller 16. The color of bi-color LED circuit 28 is controlled by the direction of the current flow through LED circuit 28 provided by the two IO ports from DSP 16.

An embedded pulse width modulator (PWM) is utilized to construct indicated flow signal 80. The same type of circuit is also used to reconstruct the sensed solenoid current 82.

DSP 16 has an external memory interface. The external memory interface interfaces to SRAM 30. This SRAM is utilized during the boot-up process and receives the contents of a serial EEPROM 32 for faster access.

Transceiver 36 can go to either a DeviceNet network 42 or may be connected through some other type of network such as LonWorks, Profibus, Ethernet or others known by those skilled in the art.

In addition to serving existing drop-in applications, which are analog, a future standard digital protocol, or several competing protocols can be served by the architecture of the present invention. This allows full compatibility as choices in networking technology and protocols are realized. The present invention provides an autonomous interface such that the flow controller system would not be affected by modular compatibility in a modular scheme. The DPRAM provides a digital partition between the DSP 16 and a to-be-determined sensor BUS network 84.

SRAM 30 is not exclusively external. A portion or all of SRAM 30 may be incorporated as internal SRAM into DSP 16 or the digital flow controller of the present invention.

In the illustrated embodiment, the SRAM is divided into two portions, external SRAM 30, and internal SRAM inside the flash memory of DSP 16. Using SRAM inside DSP 16 of digital flow controller allows all control functions to be executed within DSP 16.

Key attributes of the architecture described above eliminate the reliance on manually adjusted potentiometers. This is achieved in the present invention by choosing an architecture that has sufficient digital bandwidth to monitor flow sensors, generate control signals, such as joint differentiators and proportional interval controllers, and store multiple calibration constants while providing access to such constants in real time. Next, the digital flow controller does not depend upon multiple potentiometers to adjust the control system, rather the present invention depends upon several variables declared as constants. Access to these variables is provided via the RS485 communications port 38.

Digital communications services, such as servicing an RS485 host or a DeviceNet host, do not affect flow control events. The DPRAM 32 allows service on a scheduled basis.

Several points are monitored for diagnostics. Visual feedback is provided to a user via bi-color LED circuit 28 which has two levels of indication, either warning or an alarm, flashing or solid. This same information is available from the RS485 port and may be presented by a software application executed within an PC in a GUI interface. Control system functions are implemented via software. The present invention provides advantages over previous technology that utilized analog circuits, which are sensitive to aging effects and temperature, to construct the closed-loop control system.

The architecture of the present invention allows all of the executable embedded software to be programmed via the RS485 port. New code can be installed without removing the mass flow controller. It is important to note that flash memory embedded in DSP 16 is not used to store any calibration constants or unique data for the flow controller. This data is stored in an external serial EEPROM. The flow control system of the present invention provides autonomy and compatibility with existing and to-be-determined communication protocols such as DeviceNet.

FIG. 2 relates to technical advantages of event management within the architecture of the present invention. FIG. 2 illustrates the event time line executed by the A-to-D converter 14 of FIG. 1. When A-to-D converter 14 has acquired data and is ready to send the acquired data via the data BUS to DSP 16, a ready signal is sent.

All data processing takes place within time frame A-B, once the data has been dumped from A/D converter 14. This is the amount of time that is taken by the control system for all data processing. Between events B and C, enough time is left for other tasks to be accomplished. DeviceNet interrupt 112, real-time interrupt 114, and RS-485 interrupt 116, as illustrated in FIG. 2, occur between events B and C. If these interrupts occur between events A and B, processing collected data still has priority. Hence, these interrupts are still processed between events B and C.

Figure 3:
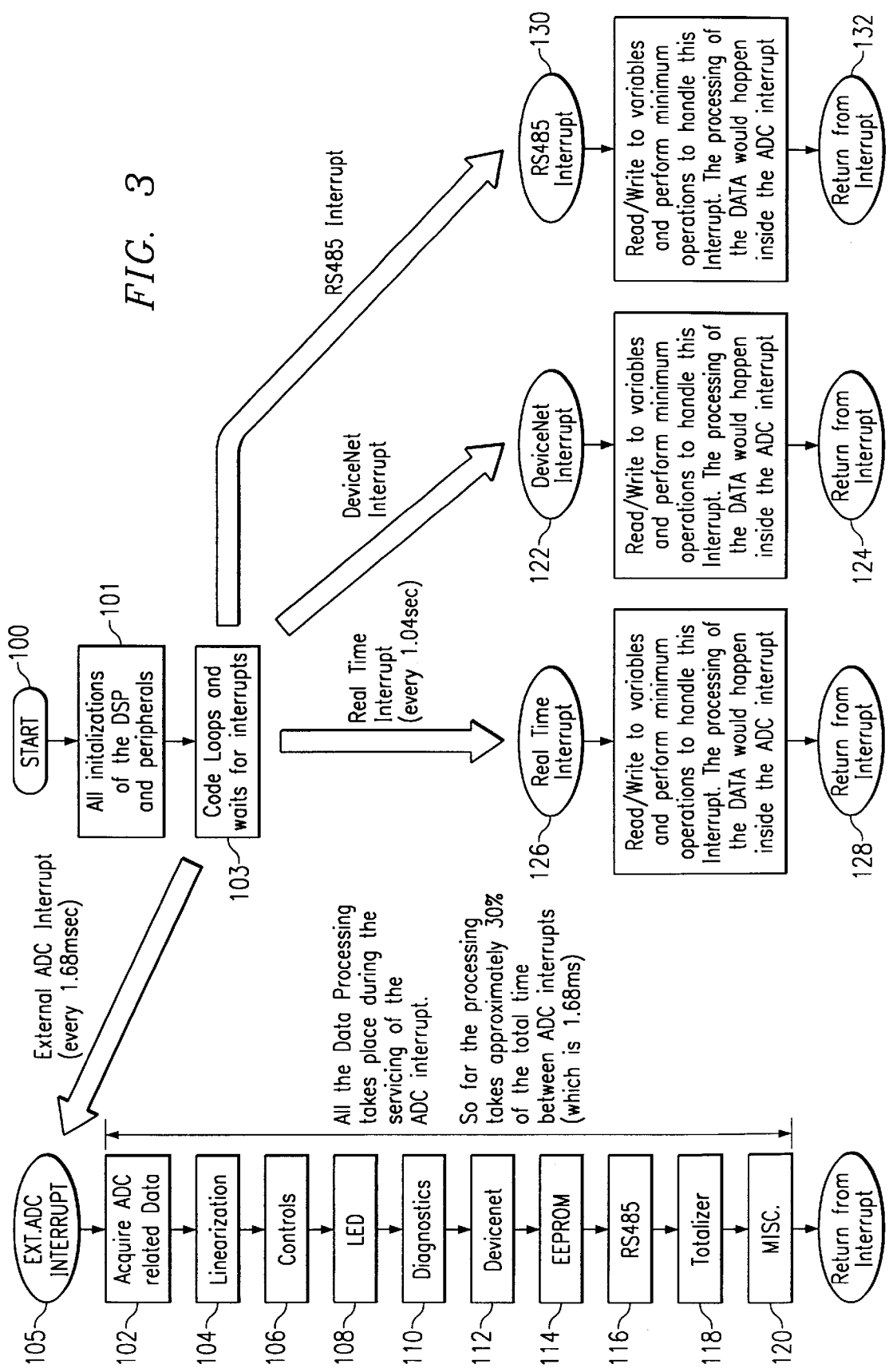
FIG. 3 contains two sets of flow diagrams illustrating the method of the present invention.

FIG. 3 contains two sets of flow diagrams. FIG. 3 further describes and details the interrupts previously shown in the timing diagram provided in FIG. 2. A method of the present invention begins at step 100. All initializations of DSP 16 and peripherals occur at step 101. During the initialization step 101 of the DSP and related peripherals, A-to-D converter 14 will be programmed to sample at a specific frequency. In one embodiment of the current invention, this frequency is chosen at 610 Hz. This 610 Hz is a signal to start acquiring data samples from A-to-D converter 14 and is the trigger for the external ADC interrupt to step 105. At step 103, the software code of the present invention continuously loops and awaits one of four interrupts. These interrupts include the external ADC interrupt which occurs every 1.68 milliseconds, the real-time interrupt which occurs every 1.04 seconds, a DeviceNet interrupt, and an RS485 interrupt. External ADC interrupt 105 allows all data processing to occur during the servicing of the ADC interrupt.

In one embodiment of the present invention, data processing takes approximately 30% of the total time between ADC interrupts, 1.68 milliseconds. During this time, at step 102, the flow controller will acquire all ADC-related data from A-to-D converter 14 of FIG. 1. Next, at step 104, this data is linearized. One such method for linearization is detailed in U.S. patent application Ser. No. 09/350,747 entitled "System and Method for Sensor Response Linearization," filed Jul. 9, 1999 by Thomas Pattantyus, et. al. In this linearization process, previously determined coefficients are utilized to relate acquired ADC data to a more accurate flow value. At step 106, linearized data and values are sent to the control system loop which will manipulate the mass flow controller to achieve the desired mass flow rate.

Step 108 involves the bi-colored LED circuit 28 of FIG. 1. Depending on the state of the flow controller 16, the LED circuit 28 would light appropriately according to a signal and current direction supplied to the bi-colored LED circuit 28 at step 108.

At step 110, diagnostics are performed. These diagnostics are directly related to the displayed state of the bi-colored LED circuit 28. DeviceNet handling occurs at step 112. At step 114, data is selected or retrieved from serial EEPROM 26. This data may include calibration constants, gas-specific data, serial numbers of the mass flow controller and related controllers, service data and diagnostic codes. At step 116, data is acquired from the RS485 interface. At step 118, the totalizer totals or integrates the time and flow measurements inside the flow controller 16. At step 120, miscellaneous housekeeping functions may occur, after which a return from this priority interrupt may occur.

Following the return from the external ADC interrupt 105, the process will return to the beginning step 100.

Any additional data sensed which would cause any additional or other interrupts, such as the real-time interrupt 126, the DeviceNet interrupt 122, or the RS485 interrupt 130, are held during the external ADC interrupt 105. External ADC interrupt 105 takes priority over all other data processing. During the processing time of approximately 50 milliseconds, data associated with other interrupts is stored in SRAM 30 or the internal RAM located within DSP 16. No matter which interrupt process occurs, when the interrupt process is complete, the method of the present invention will return to step 103 and await a future interrupt.

Real-time interrupt 124, DeviceNet interrupt 126, and RS485 interrupt 130 all allow data to be read and written to variables and stored within the DSP 16. Minimum operations occur during this interrupt to handle this data. The actual processing of this data will happen when it is accessed during the external ADC interrupt 105. An additional way to think of this is that these interrupts provide and object-oriented system linked through memory locations. Therefore, when an interrupt occurs, data is stored in the appropriate memory location until the external ADC interrupt 105 occurs and the data is processed.

Figure 4:
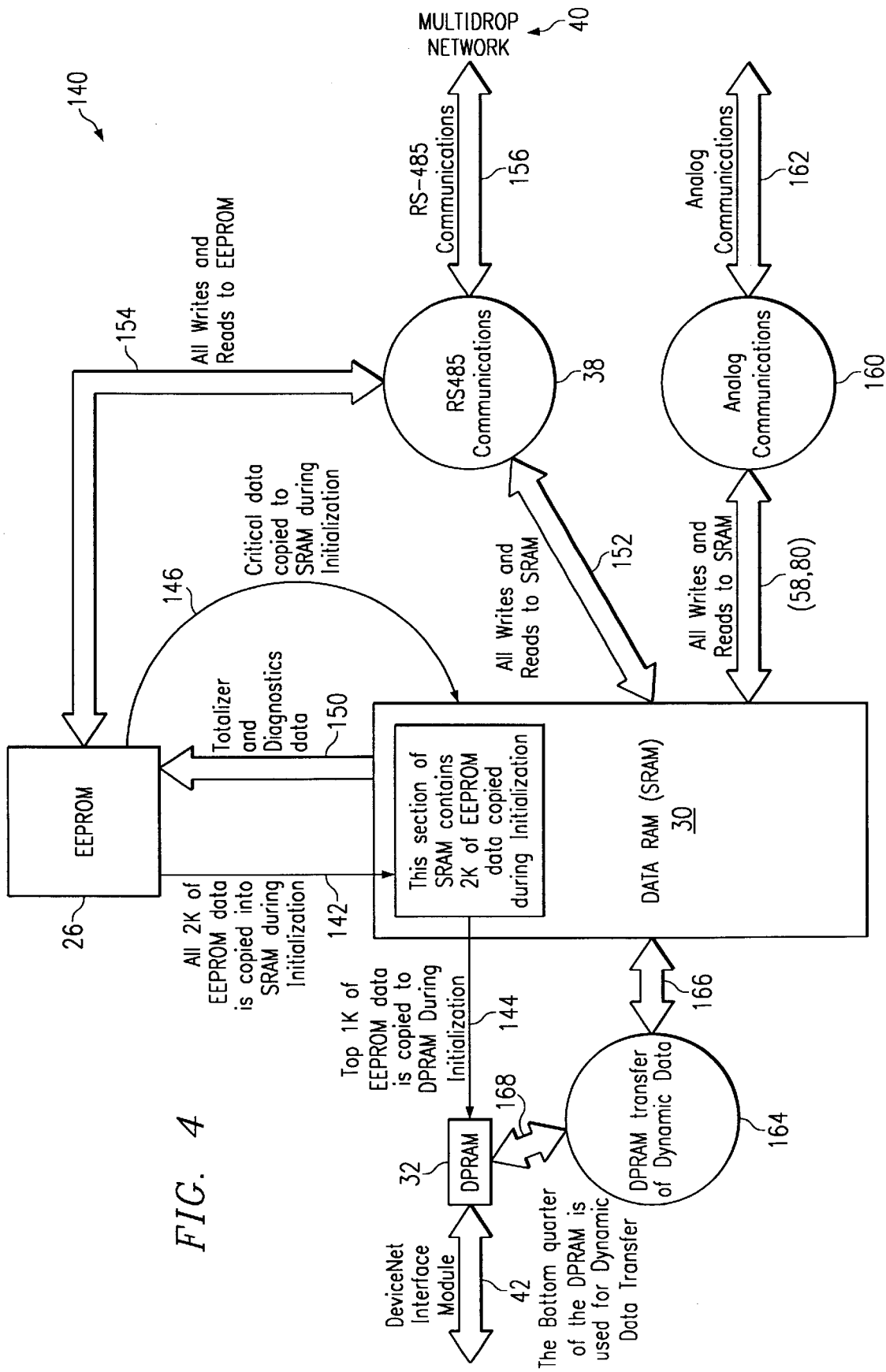
FIG. 4 describes memory interactions within the present invention.

FIG. 4 describes memory interactions within the present invention. This figure describes how the SRAM 30, EEPROM 26, and DPRAM 32 interact. For purposes of this diagram, no distinction is made for data RAM or SRAM 30 between internal RAM located on the flash memory of DSP 16 or external SRAM 30 accessible to DSP 16. SRAM 30 in this case merely describes a memory location in which to store data. During initialization, all EEPROM data is copied into the SRAM 30 as indicated by link 142. Additionally, the top 1K of EEPROM data is copied to DPRAM 32 during initialization via link 144.

An additional link 146 occurs between EEPROM 26 and SRAM 30, during which critical data is copied to the SRAM 30 during initialization. This second link is shown because copying initialization datA-to-DPRAM 32 is a two-step process. EEPROM data cannot be copied directly to DPRAM 32. Therefore, EEPROM data is first copied into a location within SRAM 30. From SRAM 30, this data is then copied to DPRAM 32 via link 144. Critical data copied to SRAM 30 during initialization would contain control system data, which goes to the internal memory location, and data for totalizers and the like.

A third link 150 indicates data being transferred from SRAM 30 to EEPROM 26. This link allows totalizer and diagnostic data to be transferred during DSP 16 operation. Link 152 is a two-way link between SRAM 30 and RS485 communication port 38 that allows data to read from and write to SRAM 30.

A second communication pathway exists between EEPROM 26 and RS485 communication port 38 via link 154, which allows all data to be read and written to EEPROM 26 from RS485 communication port 38. Therefore, the present invention allows full access to both EEPROM 26 and SRAM 30 data.

The present invention allows all data within SRAM 30 and EEPROM 26 to be accessed via RS485 communication port 38. However, a user may be limited from full access to EEPROM or SRAM data. This may be done for security purposes to ensure the unique serial number and other data from the vendor cannot be changed by the user. One example may be associated with warranty data or serial numbers of individual components.

The present invention provides an object-oriented approach where there is a method and interface from one object to another to enable diagnostics to be performed or data to be requested from or passed to another object. Certain prior technologies may have an RS485 protocol that use memory locations embedded in the protocol. This prior technology solution has a problem in that if the wrong data is transmitted to a specified memory location, a device will tend to malfunction and behave outside its specified performance. The present invention is built to perform tests to determine if requested data should be provided, to protect the data that should not be made accessible, and to test data before it is processed to ensure that it is appropriate.

Data transfer occurs via link 154, because EEPROM 26 is non-volatile, crucial data can be saved here for DSP 16. EEPROM 26 will retain data when power is lost to DSP 16. Additionally, this data may be accessed via RS485 communication port 38. Other data saved here would be gas-specific calibration data. The configuration of each mass flow controller may be dependent upon the mechanical configuration. Therefore, link 154 may be used from RS485 communication port 38 to gain direct access to EEPROM 26 to download the majority of those parameters in a fashion that does not require unique selection and tuning in order to accelerate the manufacturing process. Therefore, in the manufacturing process unique selection and tuning is not required, enhancing the speed of this process. When the device is initialized, EEPROM 26 is blank. The calibration tables and other such data may be downloaded en masse via RS485 communications link 156 to a multi-drop network 40. Multi-drop network 40 again is linked to a PC host 44.

The present invention is also designed to be compatible with legacy systems. This backward compatibility allows users to communicate to an embodiment of the present invention with an analog signal. The analog communications 160 as shown provide a functional link to either monitor a flow signal or provide a set-point control to a legacy system, as known to those skilled in the art. These analog communications may be realized by A-to-D converter functions located within A-to-D converter 14. These analog communications 162 occur between analog communications system 160 and a user host for legacy host system.

DeviceNet interface module 42 is linked to DPRAM 32. A communications co-processor may send an interrupt to the DPRAM inquiring as to its availability to receive data. Every data transfer will be an interrupt except for static data such as an ID number. Frequently accessed data will be stored in DPRAM 32 to avoid the interrupt as opposed to accessing EEPROM 26. This increases the overall efficiency by avoiding interrupts by having the readily accessible data in DPRAM 32.

FIG. 5 provides an overview of the communications associated with one embodiment of the present invention. FIG. 5 illustrates and provides an overview of three types of communication protocols which may be coupled to or compatible with one embodiment of the present invention, the DeviceNet, analog, or RS485 protocols. The present invention should not be limited to these types of protocols or communications systems, rather any combination of these communications systems. It is important to note that the architecture of the present invention can accept analog set-points from legacy systems and interface with different sources. It may also accept digital set-points and information via DeviceNet as known to those skilled in the art, or a proprietary RS485 system. This is accomplished within one common architecture.

Within each communications source, for example with the RS485 interface, it is important to note that the device may have a service mode and a normal operating mode and potentially any number of additional modes. The normal operating mode will have limited access. The service mode or command mode will have the capability to allow an authorized provider to have full access to the device, whereas these commands and systems may not be available or necessary in the normal operating mode for the normal user.

This systems or command mode allows access to diagnostic information. In the embodiment of the present invention shown in FIG. 5, calibration and tuning is done through the RS485 port and is not accessible via the DeviceNet port. The DeviceNet port is used for process control only. In addition to process control, the DeviceNet port may provide access to diagnostics that are in a DeviceNet language, alarms or exceptions.

In the analog mode, output flow values and valve voltage may be provided. Analog systems basically provide a linear op-amp circuit that provides the voltage present on the solenoid. The present invention advances the art by precisely controlling the current delivered providing a direct relationship with the force required to manipulate valve position.

Another advantage associated with the present invention is that the present invention is non-intrusive. Data need merely be monitored and analyzed. Using predictive algorithms, it is possible to save on manufacturing and maintenance costs by developing a predictive maintenance system for regular maintenance. Additionally, it is possible to determine potential failures associated with the system. This analysis may identify operation outside of a normal range but that is still within specification. This may indicate abnormal operation or that a trend or other analysis may indicate a potential failure mode associated with the system. Therefore, a sensor degradation or valve malfunction can be determined and replaced before serious damage occurs to the host system.

Trend analysis and relational data are analyzed within a diagnostic system. One embodiment of the present invention does not make decisions in the embedded system as to whether or not the system should operate, but rather the present invention develops a warning or alarm condition. The present invention may be coupled to an external system containing a graphical user interface on a PC or a similar software analysis packages known to those skilled in the art, to develop trend and relationships among different data and improve the value of diagnostics.

In FIG. 1, local PC host 44 may be the host of a multi-drop network which can be connected to a modem 46. The objective is to provide remote access to data from the present invention. FIG. 1 depicts in functional terms a second modem 48 in a remote PC 50 where remote access of the data occurs. However, the application or transport layer of the network could consist of a TCPIP or other internet application. Modem 46 and modem 48 indicate just one means of realizing a transport layer for the networking capability to provide remote access to data from the present invention. The 9600 baud half duplex mode protocol used by the present invention does comply with the seven-layer OSI model for networking, which makes it compatible with a TCPIP stack should one choose to network the present invention over an internet connection.

Figure 6:
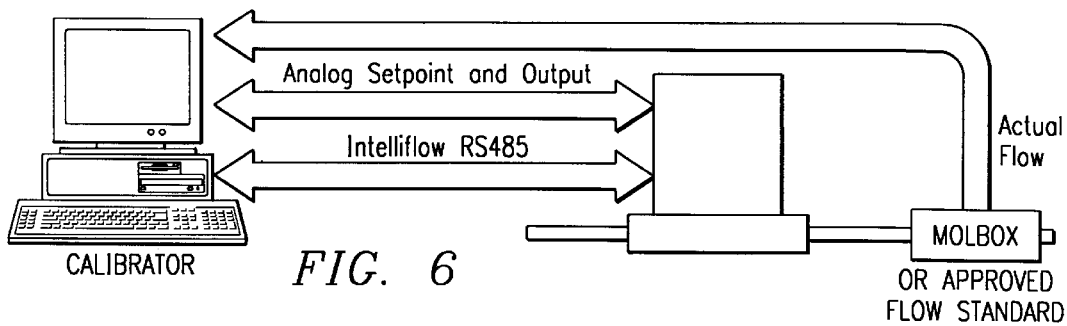
FIG. 6 describes a method and system for providing automated calibration of the mass flow controller of the present invention.
Figure 7:
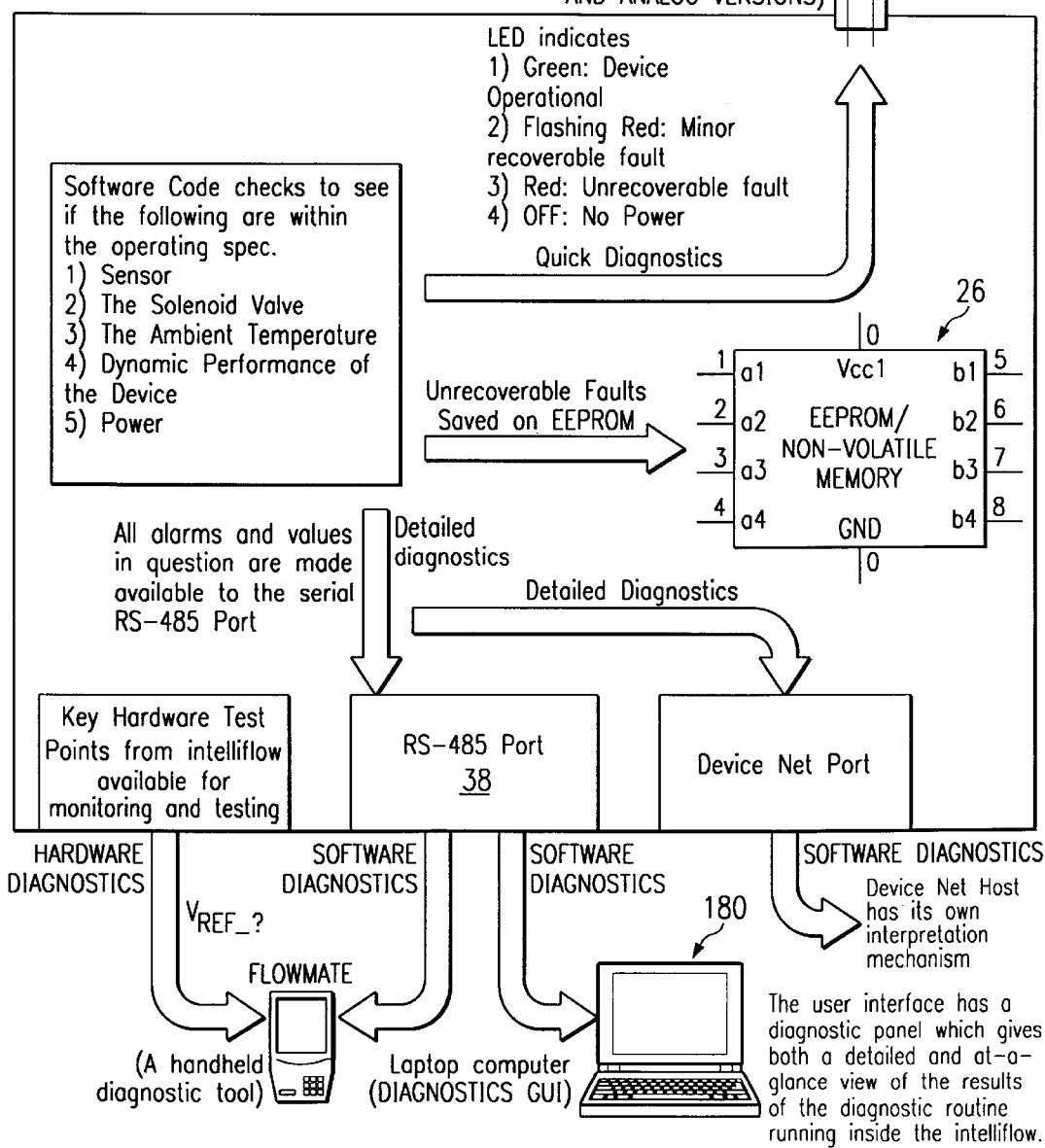
FIG. 7 depicts an overview of diagnostic capabilities of the present invention.

FIG. 6 describes a method and system for providing automated calibration of the mass flow controller of the present invention. A mass flow controller of the present invention is not calibrated, as prior solutions were, by making mechanical adjustments. Rather, a set of stored coefficients is altered to calibrate the accuracy of the mass flow controller of the present invention. Calibration consists mainly of two steps. One, linearization. This step basically irons out the non-linear behavior of the sensor and provides a linear value for the digital flow controller 16. The set-up depicted in FIG. 7 is used where the calibrator provides either an analog or digital set-point. For every applied set-point, a corresponding sensor and controlled "flow standard" value is recorded. A regression technique, as known by those skilled in the art, is applied to these points. Once calculated, these coefficients are recorded in EEPROM 26 of the present invention for use. The task of the present invention then becomes a numerical exercise where a polynomial is used with the determined coefficients to calculate the correct flow from sensed variables. This linearization process may be repeated for individual gases and stored inside EEPROM or other memory location within the present invention.

Dynamic tuning provides the ability to measure flow during transient events. Logic will be incorporated into the host PC that will adjust the set-point conditions in order to control flow conditions and achieve the expected flow in a transient condition.

An additional embodiment of the present invention may incorporate a system to record actual flow conditions and sensed flow conditions. This data may be analyzed statistically for various mechanical platforms to which the mass flow controller of the present invention may be attached. This data can be used to establish trends and, in conjunction with logic or artificial intelligence as known to those skilled in the art. Control parameters can be incremented for a given performance criteria until such performance is optimized.

FIG. 7 provides a overview of the diagnostic capabilities of the present invention. Bi-color LED circuit 28 provides a status indicator. LED circuit 28 indicates when green that the present invention is operational. If the bi-color LED circuit 28 is flashing red, a minor recoverable fault is indicated. If bi-color LED circuit 28 indicates a solid red, a unrecoverable fault has occurred. A final condition of the bi-color LED circuit 28 is no light, which indicates that there is no power to the MFC of the present invention. The status of bi-color LED circuit 28 is determined after a software code within the mass flow controller evaluates whether monitored variables are operating within specified parameters. These variables include outputs from the sensor, solenoid valve, the ambient temperature of the device of the present invention, the power supply to the present invention, and a measure of dynamic performance of the present invention. Any unrecoverable faults that are determined by the software code will be stored within the EEPROM non-volatile memory 26. Additionally, all data values can be made available over the DeviceNet port or RS485 port 38. The data from RS485 port 38 or the DeviceNet port can be sensed by a software diagnostic program running on a portable computer such as a laptop or other specialized computing device. This software would provide a user an interface that would give the user a detailed view of the results of the diagnostic routines running inside the present invention. A specialized tool such as a hand-held diagnostic tool, can also sense software diagnostic data from RS485 port 38 or specified test points within the present invention. For the DeviceNet port, a separate and unique interpreting mechanism is incorporated to read the results of the software diagnostics. A second software program running on a portable computer or portable diagnostic tool can be configured in an additional embodiment to read the results of the software diagnostics from the DeviceNet port.

The present invention addresses many problems associated with the prior art. High cost of ownership assumed by a user due to unscheduled and unexpected failed mass flow controllers that are often arbitrarily replaced without any justification. This is because historically mass flow controllers have been seen as unreliable and undependable, and many users do not understand how a mass flow controller operates. Because of this failure to understand the operation of the mass flow controller and the problems associated with calibrating a mass flow controller, field service is required to provide technical support and failure analysis of suspected mass flow controllers once installed on a system. Historically, mass flow controllers have been tuned or calibrated based on an individual technician's explicit knowledge of device performance, using multi-turn potentiometers or variable resistors. This calibration is a time- and labor-consuming subjective event directly affecting device performance. Because of the manual tuning and calibration of the mass flow controllers of the prior art, non-uniform transient response is often experienced with their use. Furthermore, the mass flow controllers of the prior art have been found to be extremely sensitive to inlet pressure. Additionally, the mass flow controllers of the prior art are generally analog systems or proprietary RS485 networks.

The present invention provides a system containing the ability for forward compatibility with multiple open communications standards such as DeviceNet, LonWorks, and Profibus which still maintaining a backwards compatibility with legacy interfaces.

Troubleshooting and analysis of failed mass flow controllers have required that the mass flow controller be removed from operation and installation within its installed system. This is a costly event can be eliminated by directly monitoring the mass flow controller in operation as is accomplished by the present invention. The present invention contains a digital engine which discretely monitors the set-point, solenoid current, ambient temperature, sensor base resistance, and inlet pressure indication, as well as power supply voltages, flow errors, valve leak and transient response. These monitored parameters can be analyzed (manually or automatically) to track and determine abnormal trends associated with the operation of the device of the present invention. Furthermore, this data can be monitored remotely via a modem or other network connection to a host PC.

The mass flow controller of the present invention does not contain any variable manual adjustments. This provides an advantage in that all calibration and tuning is completed digitally via storage of a unique set of constants stored in non-volatile memory. Access to the relevant memory locations is provided via the dedicated RS485 interface. The calibration system host running the appropriate software along with interfacing to specific flow measuring instrumentation can automatically calibrate and tune the mass flow controller of the present invention for uniform repeatable performance in static and transient flow conditions. These uniform transient responses provide an addition advantage of the present invention. These uniform transient responses are achieved by using the computational power provided by the selected digital signal processor as applied in the chosen architecture. This architecture allows 100% of the control algorithms to be implemented via software. The software algorithms can contain mechanisms to invoke unique case-sensitive or situational parameters that can be selected or tuned to achieve a uniform and repeatable transient response.

Yet another advantage of the present invention is to eliminate the need for expensive upstream pressure regulators within a gas supply. The digital engine of the present invention has the capability to discretely monitor the inlet pressure via an available A-to-D input. It is desirable to monitor the input pressure and desensitize the mass flow characteristics of the output of the present invention.

A further advantage of the present invention is that it contains multiple autonomous dedicated digital communication ports. The architecture of the embodiment described above allows two digital networks to be serviced simultaneously, provided that one of them is an RS485 type network. The chosen DSP includes an embedded UART peripheral which is dedicated to service RS485 networks. An additional communication network can be serviced via reading and writing to a dual-port SRAM. The selection of the dual-port SRAM as a communication partition enables the support of multiple autonomous interchangeable interfaces. The present invention should not be necessarily limited to these two communication ports. Multiple communication ports of various communication protocols as known to those skilled in the art can be incorporated into the present invention to achieve multiple autonomous interchangeable interfaces.

An additional advantage of the present invention is that the embedded system manages events based upon receiving sample data from the flow signal at precise discrete intervals of 1.68 milliseconds. Due to the computational power of the chosen architecture, the control's algorithm completes its task in less than 30% of this time.

The present invention provides historical data, trends, analysis, relational data. Such data can be archived enhancing a service technicians ability to remotely diagnose or locally diagnose via a host system connected to a dedicated service port to determine current operation.

Various mass flow controllers exist on the market. A mass flow controller may include a linearization circuit to aid in linearizing the flow sense signal. Particular reference is made to U.S. patent application Ser. No. 09/350,747 filed on Jul. 9, 1999, by T. T. Pattantyus, et al., entitled "System and Method for Sensor Response Linearization." A mass flow controller may also include an improved Mass Flow Interface Circuit that measures mass flow within a mass flow controller by sensing the resistance change of a sense resistor or resistors in response to gas flow. Particular reference is made to the improved mass flow interface circuit disclosed in U.S. patent application Ser. No. 09/350,746 filed on Jul. 9, 1999, by D. S. Larson et al., entitled "Improved Mass Flow Sensor Interface Circuit." A mass flow controller may also include a derivative controller that corrects the sensed flow signal to more accurately approximate the actual flow through the mass flow controller. A PI controller can also be included in a mass flow controller to generate a valve drive signal to control a valve in the mass flow controller. The PI controller can increase the speed of response of the mass flow controller and compensate for a nonlinear response of the valve to the valve drive signal. Lastly, the valve drive signal in a mass flow controller can be input to valve drive circuitry to control a solenoid activated valve. It is important to note that the present invention is not limited to use in a mass flow controller that includes the components described above.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. An electronic control system for a mass flow controller comprising:
   a flow sensor;
   a digital signal processor coupled to an output of said flow sensor, wherein said digital signal processor implements software instructions that execute a closed loop control signal;
   a memory location coupled to said digital signal processor, wherein said memory location is operable to store calibration data unique to the mass flow controller;
   at least one communication port operable to couple said electronic control system to a network system;
   an actuator mechanism driven by a control signal outputted from said digital signal processor; and
   a control valve within the mass flow controller operated on by said actuator mechanism.

2. The electronic control system for a mass flow controller of claim 1, further comprising an embedded diagnostic system, wherein the diagnostic system identifies fault or potential fault conditions in the mass flow controller.

3. The electronic control system for a mass flow controller of claim 2, wherein the embedded diagnostic system provides a visual indication of fault or potential fault conditions in the mass flow controller.

4. The electronic control system for a mass flow controller of claim 2, wherein the embedded diagnostic system further comprises an interface to communicate fault or potential fault conditions in the mass flow controller to remote diagnostic system via said communication port.

5. The electronic control system for a mass flow controller of claim 4, wherein the remote diagnostic system includes a historical database of mass flow controller fault conditions and indications of these fault conditions.

6. The electronic control system for a mass flow controller of claim 1, wherein the electronic control system utilizes a control algorithm to provide a desired output flow through the mass flow controller independent of pressure and flow fluctuations within a supply flow to the mass flow controller.

7. The electronic control system for a mass flow controller of claim 1, wherein electronic control system:
   calculates a real time flow error using an algorithm which receives an input on a series of system variables comprising:
   a desired output flow setpoint;
   a solenoid current;
   an ambient temperature;
   a base resistance of the sensor;
   an inlet pressure indication;
   at least one power supply voltage;
   a leakage through the control valve;
   an overshoot of actual output flow as compared to the desired output flow setpoint; and
   adjusts the control signal to achieve the desired output flow based on a real time calculated flow error.

8. The electronic control system for a mass flow controller of claim 7, wherein the algorithm is derived is a polynomial expression using regression techniques, wherein the expression is stored as a series of constants in a memory location accessible by the electronic control system.

9. The electronic control system for a mass flow controller of claim 8, further comprising:

a calibration system to monitor the series of system variables and the actual flow output and calculate the series of constants representing the polynomial expression.

10. The electronic control system for a mass flow controller of claim 1, wherein the at least one communication port supports perphials chosen from the group of RS485 or UART.

* * * * *